United States Patent [19]

Kondo et al.

[11] Patent Number: 5,738,607
[45] Date of Patent: Apr. 14, 1998

[54] CONTROL SYSTEM FOR AUTOMATIC TRANSMISSION FOR VEHICLE

[75] Inventors: Noboru Kondo; Kenzo Nishida, both of Wako, Japan

[73] Assignee: Honda Giken Kogyo Kabushiki Kaisha, Tokyo, Japan

[21] Appl. No.: 597,519

[22] Filed: Jan. 31, 1996

[30] Foreign Application Priority Data

Feb. 1, 1995 [JP] Japan ................................ 7-015092

[51] Int. Cl.⁶ .................................................. F16H 61/16
[52] U.S. Cl. ........................... 477/125; 477/142; 74/336 R
[58] Field of Search ..................... 477/122, 125, 477/134, 137, 142; 74/336 R

[56] References Cited

U.S. PATENT DOCUMENTS

| | | | |
|---|---|---|---|
| 4,817,471 | 4/1989 | Tury | 477/125 |
| 4,922,769 | 5/1990 | Tury | 477/125 |
| 5,089,965 | 2/1992 | Braun | 477/125 |
| 5,416,698 | 5/1995 | Hutchison | 477/125 |

FOREIGN PATENT DOCUMENTS

| | | |
|---|---|---|
| 0 170 465 | 5/1986 | European Pat. Off. . |
| 0 365 715 | 2/1990 | European Pat. Off. . |
| 0 467 773 | 1/1992 | European Pat. Off. . |
| 0 589 145 | 3/1994 | European Pat. Off. . |
| 59-37359 | 2/1984 | Japan . |
| 2-8545 | 1/1990 | Japan . |
| 2-125174 | 5/1990 | Japan . |
| 2 282 195 | 3/1995 | United Kingdom . |

*Primary Examiner*—Khoi Q. Ta
*Assistant Examiner*—Sherry Lynn Estremsky
*Attorney, Agent, or Firm*—Armstrong, Westerman, Hattori, McLeland & Naughton

[57] ABSTRACT

In an automatic transmission in which a shifting command can be output by a manual operation of a manual shift lever, in addition to an automatic shifting based on a usual shifting map, the shifting command is possibly executed while preventing an over-revolution and stalling of an engine due to an inappropriate shifting command. If the vehicle speed is in a shifting prohibiting range with a possibility that an over-revolution or stalling of the engine may be caused, when a shifting command is output, the shifting is prohibited, and a timer is set. When the present vehicle speed is translated from the shifting prohibiting range to a shifting permitting range as a result of change in vehicle speed, during counting by the timer, the shifting which has been prohibited is executed.

16 Claims, 7 Drawing Sheets

CONTROL SYSTEM FOR AUTOMATIC TRANSMISSION FOR VEHICLE

BACKGROUND OF THE INVENTION

1. Field of the Invention

The present invention relates to a control system for an automatic transmission for a vehicle, wherein manual shifting can be carried out in addition to automatic shifting based on a usual shifting map.

2. Description of Related Art

There is a conventionally known automatic transmission designed so that an optimal gear shift stage is selected by searching a shifting map using detection values such as vehicle speed, engine load and the like as parameters, and an automatic shifting operation is conducted to establish such gear shift stage. In such an automatic transmission, shifting characteristics are established on the basis of the general travel state of the vehicle. For this reason, a following problem is encountered: it is difficult to select the optimal gear shift stage in all travel states, even when a throttle opening degree and an amount of accelerator pedal depression are detected, and this eventually results in a uniform selection of the gear shift stage. There are also conventionally known automatic transmissions in which a shifting characteristic weighted for power performance and a shifting characteristic weighted for specific fuel consumption can be selected. In any of these automatic transmissions, however, it is unlikely that a shifting characteristic suitable for the driver's preference is completely realized.

Therefore, automatic transmissions have been proposed which are designed so that a driver can select any gear shift stage by operating a switch or a lever (see Japanese Patent Application Laid-open Nos.37359/84, 8545/90 and 125174/90). In such automatic transmission, when a shifting operation is manually conducted by the driver without due consideration of a travel state of a vehicle, there is a possibility of an engine over-revolution produced by downshifting, or an engine stalling produced by upshifting. Therefore, in the automatic transmission described in Japanese Patent Application Laid-open No.125174/90, the manual shifting is limited in accordance with the number of revolutions (rpm) of the engine.

In the above known automatic transmissions adapted to provide a limit to the manual shifting in accordance with the number of revolutions (rpm) of the engine, however, there is a problem that even if the manual shifting command is executed by the driver, if conditions such as the number of revolutions (rpm) of the engine permitting the shifting in such moment, or the like, are not established, the commanded shifting is not carried out and for this reason, the driver feels a sense of incompatibility, and a re-operation must be conducted. In addition, it is impossible for the driver to recognize whether or not the driver's shifting command has been received and hence, there is also a possibility of mis-recognition of a trouble.

SUMMARY OF THE INVENTION

The present invention has been accomplished with the above circumstances in view, and it is an object of the present invention to enable the driver's shifting command to be possibly executed, while preventing an over-revolution and stalling of the engine, thereby further enhancing the manual shifting function.

To achieve the above object, according to the present invention, there is provided a control system for an automatic transmission for a vehicle for controlling a gear ratio of the automatic transmission based on an output from a vehicle speed detecting means for detecting a value corresponding to a vehicle speed and an output from an engine load detecting means for detecting a value corresponding to an engine load, the system comprising; a shifting command means for outputting a predetermined shifting command by a manual operation for changing the gear ratio; a range determining means for determining a permitting range in which the execution of a command output by the shifting command means is permitted, and a prohibiting range in which the execution of the shifting command is prohibited, based on the output from the vehicle speed detecting means or the output from the engine load detecting means; and a retarding means for executing the shifting command when an operational state of the vehicle is brought into the shifting permitting range within a predetermined period after the operational state of the vehicle is brought into the shifting prohibiting rage and the shifting command is output by the shifting command means.

According to the present invention, additionally, the predetermined period is counted by a timer which starts counting a time period when the shifting command is output by the shifting command means.

According to the present invention, additionally, the system further includes an informing means for informing a driver that the shifting command has been output in the shifting prohibiting range.

According to the present invention, additionally, the shifting command output by the shifting command means is a downshifting command.

According to the present invention, additionally, the shifting command output by the shifting command means is an upshifting command.

According to the present invention, additionally, the predetermined period is variable depending upon the type of the shifting command.

According to the present invention, additionally, the type of the shifting command includes a downshifting command and an upshifting command.

According to the present invention, additionally, the predetermined period in the downshifting is longer than that in the upshifting.

According to the present invention, additionally, the type of the shifting command includes a one-stage shifting command and a multi-stage shifting command.

According to the present invention, additionally, the predetermined period in the multi-stage shifting is longer than that in the one-stage shifting.

With the above features, the range determining means determines the permitting range in which the execution of the command output by the shifting command means is permitted, and the prohibiting range in which the shifting command is prohibited, based on the output from the vehicle speed detecting means or the output from the engine load detecting means. If an operational state of the vehicle is in the shifting prohibiting range when the shifting command means outputs a predetermined shifting command by manual operation, the execution of the shifting command is retarded by the retarding means. When the operational state of the vehicle is brought into the shifting permitting range within the predetermined period after the output of the shifting command, the shifting command is executed.

DETAILED DESCRIPTION OF THE INVENTION

The present invention will now be described by way of an embodiment of the present invention with reference to the accompanying drawings.

Figure 1:
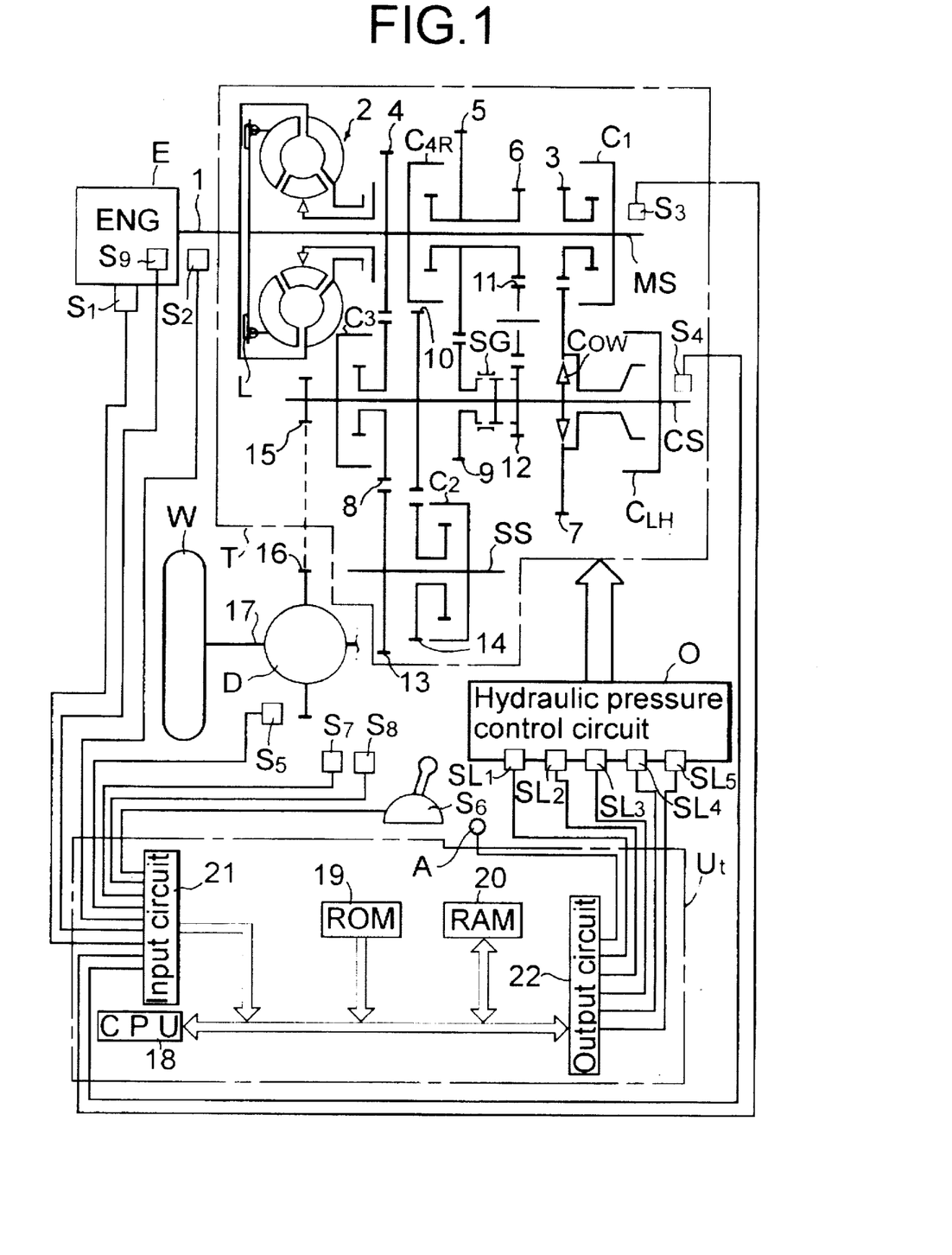
FIG. 1 is a schematic illustration of the entire arrangement of an automatic transmission for a vehicle and a control system therefor.

FIG. 1 shows a 7-position type automatic transmission T for a vehicle in which it is possible to select any of the following seven ranges by the select lever: a "P" range, for parking, an "R" range, for reverse, an "N" range, for neutral, a "D" range, for a first- to fourth-shift automatically shiftable range, an "M" range for a first- to fourth-shift manually shiftable range, a "2" range, for a second-shift fixing range including a downshifting from a third gear shift stage to a second gear-shift stage, and a "1" range, for a first-shift fixing range including a downshifting from the second gear-shift stage to a first gear-shift stage.

The automatic transmission T, FIG. 1, includes a main shaft MS, connected to a crankshaft 1, of an engine E, through a torque converter 2, having a lock-up clutch L, and a counter shaft CS and a secondary shaft SS disposed parallel to the main shaft MS.

Carried on the main shaft MS are a main first-shift gear 3: a main second-shift/third-shift gear 4, a main fourth-shift gear 5 and a main reverse gear 6. Carried on the counter shaft CS are a counter first-shift gear 7 meshed with the main first-shift gear 3, a counter second-shift/third-shift gear 8 meshed with the main second-shift/third-shift gear 4, a counter fourth-shift gear 9 meshed with the main fourth-shift gear 5, a counter second-shift gear 10, and a counter reverse gear 12 connected to the main reverse gear 6 through a reverse idle gear 11. Carried on the secondary shaft SS are a first second-shift gear 13 meshed with the counter second-shift/third-shift gear 8, and a second secondary second-shift gear 14 meshed with the counter second-shift gear 10.

When the main first-gear 3, relatively rotatably carried on the main shaft MS, is coupled to the main shaft MS by a first-shift clutch $C_1$, a first gear-shift stage is established. The first-shift clutch $C_1$ is maintained in its engaged state even when any of second to fourth gear-shift stages is established, and hence, the counter first-shift gear 7 is supported through a one-way clutch $C_{OW}$. When the second secondary second-shift gear 14, relatively rotatably carried on the secondary shaft SS, is coupled to the secondary shaft SS, by a second-shift clutch $C_2$, a second gear-shift stage is established. When the counter second-shift/third-shift gear 8, relatively rotatably carried on the counter shaft CS, is coupled to the counter shaft CS by a third-shift clutch $C_3$, a third gear-shift stage is established.

When the main fourth-shift gear 5, relatively rotatably carried on the main shaft MS, is coupled to the main shaft MS by a fourth-shift/reverse clutch $C_{4R}$, in a condition in which the counter fourth-shift gear 9, relatively rotatably carried on the counter shaft CS, has been coupled to the counter shaft CS by a select gear SG, a fourth gear shift stage is established. When the main reverse gear 6, relatively rotatably carried on the main shaft MS, is coupled to the main shaft MS by a fourth-shift/reverse clutch $C_{4R}$, in a condition in which the counter reverse gear 12, relatively rotatably carried on the counter shaft CS, has been coupled to the counter shaft CS by the select gear SG, a backward gear-shift stage is established.

The rotation of the counter shaft CS is transmitted, through a final drive gear 15 and a final driven gear 16, to differential D and then, from the differential D, through left and right axles 17, 17, to driven wheels W, W.

Further, when the counter first-shift gear 7 is coupled to the counter shaft CS, by the first-shift holding clutch $C_{LH}$, in a condition in which the first-shift clutch $C_1$ has been brought into its engaged state, a first-shift holding gear shift stage is established. If the first-shift holding gear shift stage is established, when an engine brake is required, the torque of the driven wheels W, W can be transmitted back to the engine E, even if the one-way clutch $C_{OW}$ is slipped.

An electronic control unit Ut, for controlling the automatic transmission T, includes CPU 18, ROM 19, RAM 20, an input circuit 21 and an output circuit 22.

Inputted to the input circuit 21, of the electronic control unit Ut, are a throttle opening degree TH, detected by a throttle opening degree sensor (engine load detecting means) $S_1$ mounted in the engine E, in engine revolution-number Ne, detected by an engine revolution-number sensor $S_2$, mounted in the engine E, a main shaft revolution-number Nm, detected by a main shaft revolution-number sensor $S_3$, mounted on the main shaft MS, a counter shaft revolution-number Nc, detected by a counter shaft revolution-number sensor $S_4$, mounted on the counter shaft CS, a vehicle speed V, detected by a vehicle speed sensor $S_5$, mounted on the differential D, a select lever position P, detected by a select lever position sensor $S_6$, a signal from an upshifting switch $S_7$, which will be described hereinafter, a signal from a downshifting switch $S_8$, which will be described hereinafter, and a cooling-water temperature Tw, detected by a water temperature sensor $S_9$, mounted in the engine E.

The output circuit 22, of the electronic control unit Ut, is connected to five solenoids $SL_1$, $SL_2$, $SL_3$, $SL_4$ and $SL_5$, mounted in a hydraulic pressure control circuit O, to control the operations of the first-shift clutch $C_1$, the second-shift clutch $C_2$, the third-shift clutch $C_3$, the fourth-shift/reverse clutch $C_{4R}$, the first-shift holding clutch $C_{LH}$, the selector gear SG and the lock-up clutch L. The solenoid $SL_1$ governs the turning ON and OFF of the lock-up clutch L. The solenoid $SL_2$ governs the control of the capacity of the lock-up clutch L. The solenoids $SL_3$ and $SL_4$ govern the turning ON and OFF of the first-shift clutch $C_1$, the second-shift clutch $C_2$, the third-shift clutch $C_3$, the fourth-shift/reverse clutch $C_{4R}$ and the first-shift holding clutch $C_{LH}$, as well as the operation of the selector gear SG. The solenoid $SL_5$ governs the control of the clutch hydraulic pressure.

Further, an informing means A, such as a buzzer, a lamp, a speaker and the like, for informing the driver, is connected to the output circuit 22 of the electronic control unit Ut.

Figure 2:
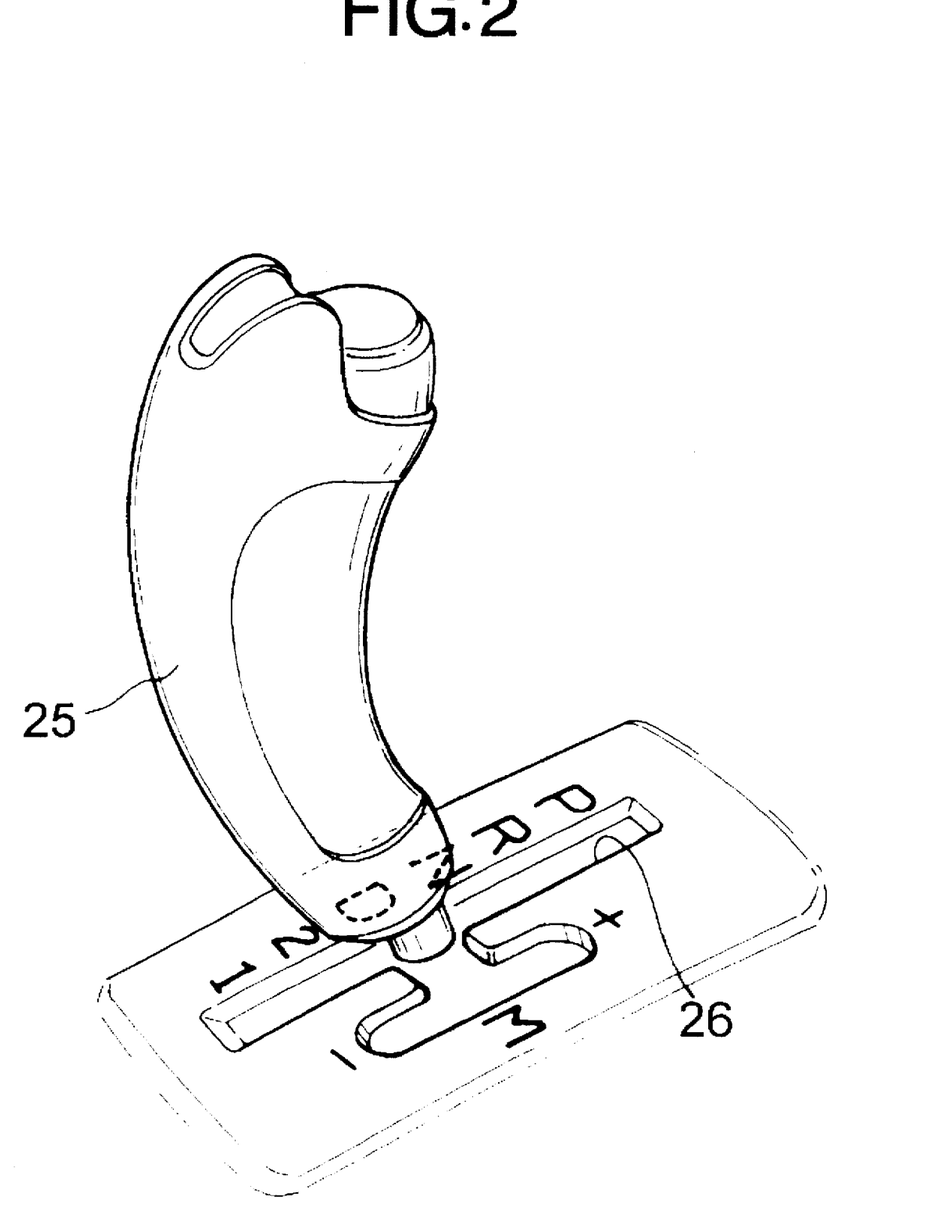
FIG. 2 is a perspective view of a select lever used along with a manual shift lever.

As shown in FIG. 2, the ranges selected by the select lever 25, include the "M" range (the first- to fourth-shift manually shiftable range) in addition to the usual "P", "R", "N", "D", "2" and "1" ranges. A guide groove 26, for guiding the select lever 25, is formed into a substantially H shape. A position, to which the select lever 25 is tilted rightwardly from the "D" range, is the "M" range, where the select lever 25 is tiltable longitudinally. If the select lever 25 is tilted forwardly (in a plus direction) in the "M" range, the upshifting switch $S_7$ is operated, to output an upshifting command. On the other hand, if the select lever 25 is tilted rearwardly (in a minus direction), the downshifting switch $S_8$ is operated to output a downshifting command.

Figure 3:
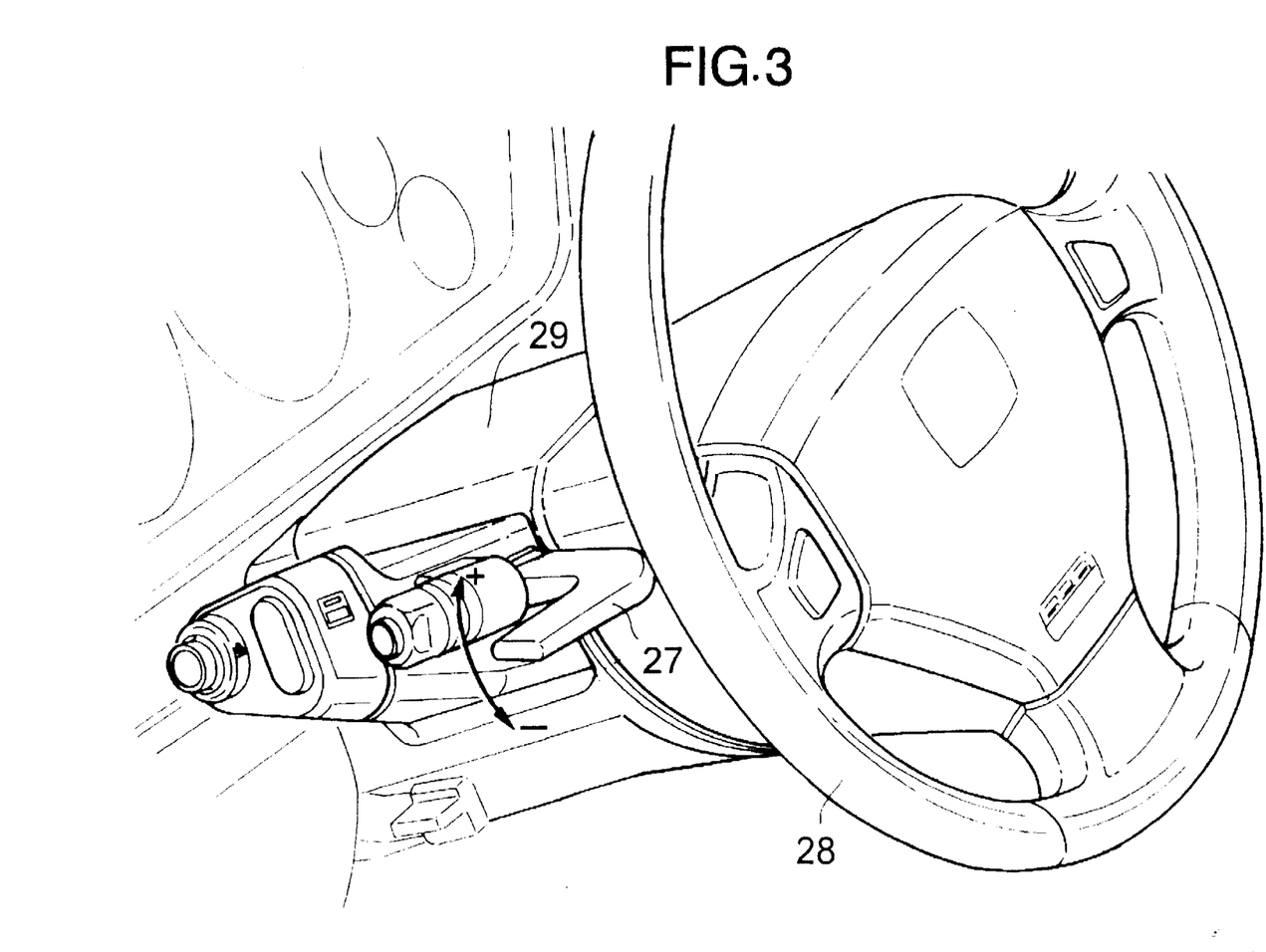
FIG. 3 is a perspective view of the manual shift lever mounted on a steering column.

FIG. 3 shows a manual shift lever 27, mounted independently from the select lever 25. The manual shift lever 27 is vertically swingably mounted on a left side of a steering column 29, which supports a steering wheel 28. The select lever 25 (not shown) has the "M" range between the "D" and "2" ranges. If the manual shift lever 27 is tilted upwardly (in the plus direction) in a condition in which the "M" range has been selected by the select lever 25, the upshifting switch $S_7$ is operated to output the upshifting command. On the other hand, if the manual shift lever 27 is tilted downwardly (in the minus direction), the downshifting switch $S_8$ is operated to output the downshifting command.

Figure 4:
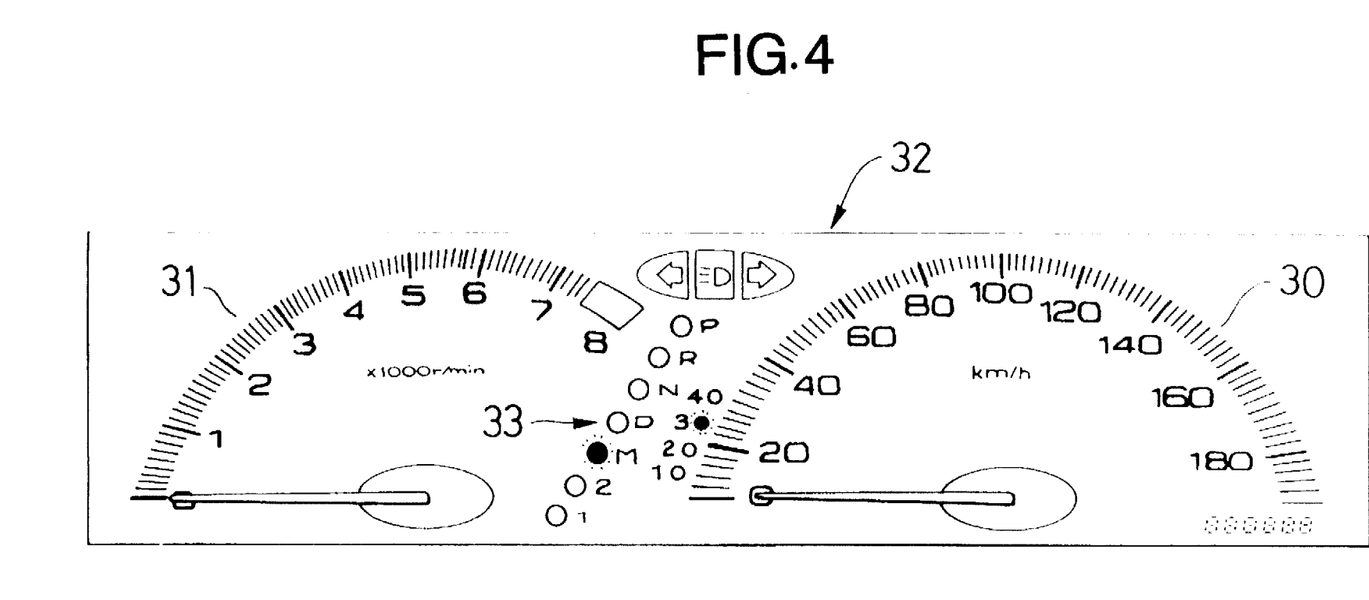
FIG. 4 is illustration of an indicator for selected positions and gear-shift stages.

A range selected by the select lever 25, FIG. 2, is indicated by an indicator 33. FIG. 4, which is mounted on a meter panel 32 including a speedometer 30 and a tachometer 31, as shown in FIG. 4. When the "M" range is selected, the gear shift stage currently established is indicated by the indicator 33. Alternatively, a range selected by the select lever 25 may be indicated on an indicator 33, provided in a tachometer 31, or the like, as shown in FIG. 5, and when the "M" range is selected, the gear shift stage, currently established, is indicated on the indicator 33.

Figure 5:
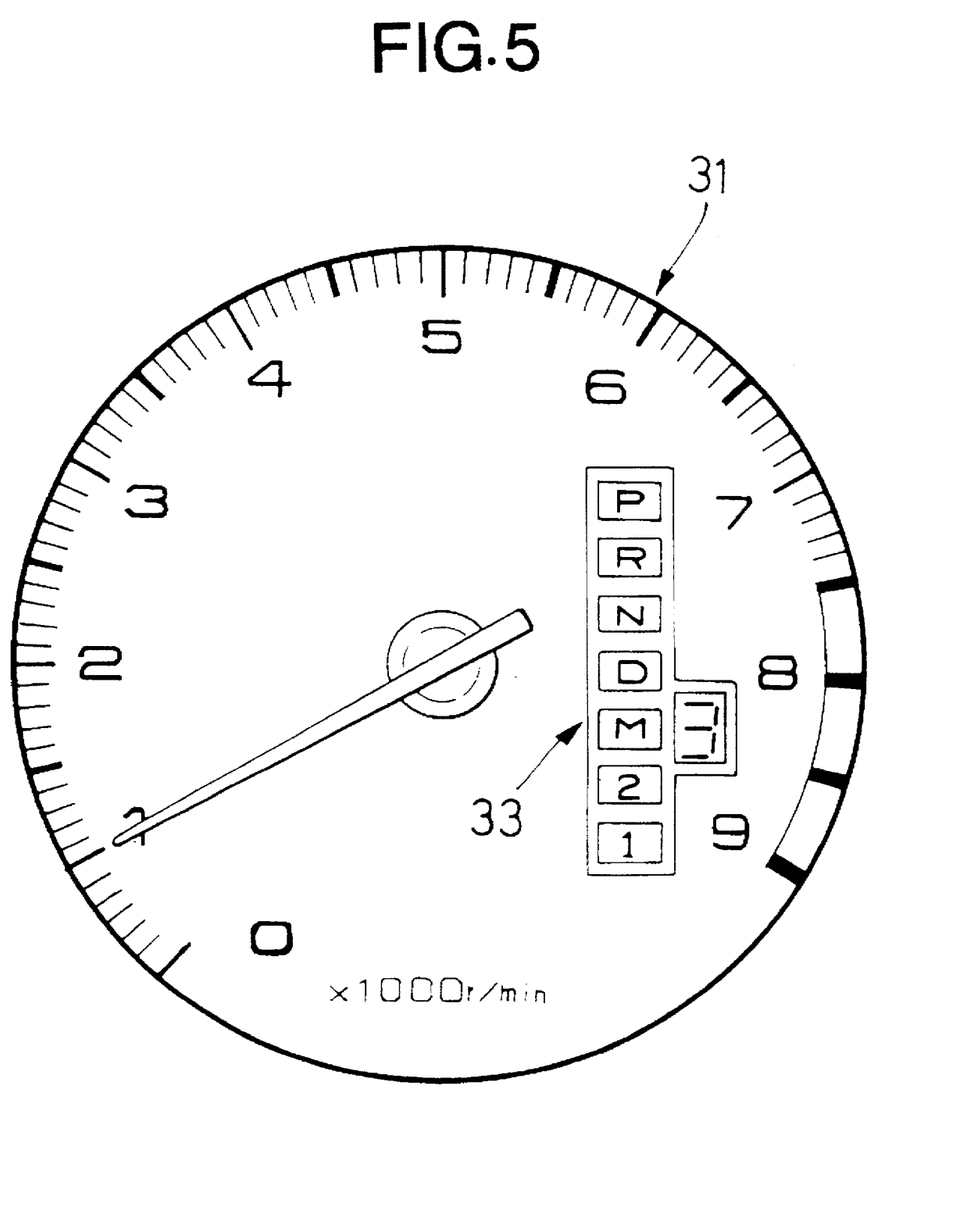
FIG. 5 is an illustration of another example of an indicator for selected positions and gear-shift stages.

In FIGS. 4 and 5, if the indication of the gear shift stage, currently established, is flashed, the visual recognizability is further enhanced. In place of indicating the first-shift to fourth-shift gear shift stages by numerals 1 to 4, respectively, the gear ratio in each of these gear shift stages may be indicated.

When the "D" range has been selected, by the select lever 25, the upshifting and downshifting, between the first-shift to fourth-shift gear shift stages, are automatically carried out based on a shift map using, as parameters, the vehicle speed V, detected by the vehicle speed sensor $S_5$ and the throttle opening degree TH, detected by the throttle opening degree sensor $S_1$. When the "2" range is selected, the second gear shift stage is established. However, if the vehicle speed provided upon selection of the "2" range is large, so that an over revolution occurs in the second gear shift stage, the third gear shift stage is first established, and after the vehicle speed is reduced, the third gear shift stage is downshifted to the second gear shift stage which is then fixed. Similarly, if the vehicle speed provided upon selection of the "1" range is large, so that an over revolution occurs in the first-shift holding gear shift stage, the second gear shift stage is first established, and after the vehicle speed is reduced, the second gear shift stage is downshifted to the first-shift holding gear shift stage which is then fixed.

When the range has been switched over from the "D" range to the "M" range, if the gear shift stage in the "D" range, before the switching-over, is any of the first to third gear shift stages, the same gear shift stage is held in the "M" range after the switching-over. If the gear shift stage in the "D" range, before the switching-over, is the fourth gear shift stages, the third gear shift stage is established in the "M" range, after the switching-over. However, if an over revolution occurs, upon the establishment of the third gear shift stage, the fourth gear shift stage is established.

When the range has been switched over from the "2" range to the "M" range, even if the gear shift stage in the "2" range, before the switching-over, is any of the third and second gear shift stages, the third gear shift stage is established in the "M" range, after the switching-over. However, when the range has been switched over from the "2" range to the "M" range, during stoppage of the vehicle, the first gear shift stage is established in the "M" range, after the switching-over.

Further, by operating the upshifting switch $S_7$, or the downshifting switch $S_8$, during stoppage of the vehicle, the first or second gear shift stage can be selected as a gear shift stage at the start of the vehicle.

The operation of the upshifting switch $S_7$ and the downshifting switch $S_8$ in performing the manual shifting will be described below.

Figure 6:
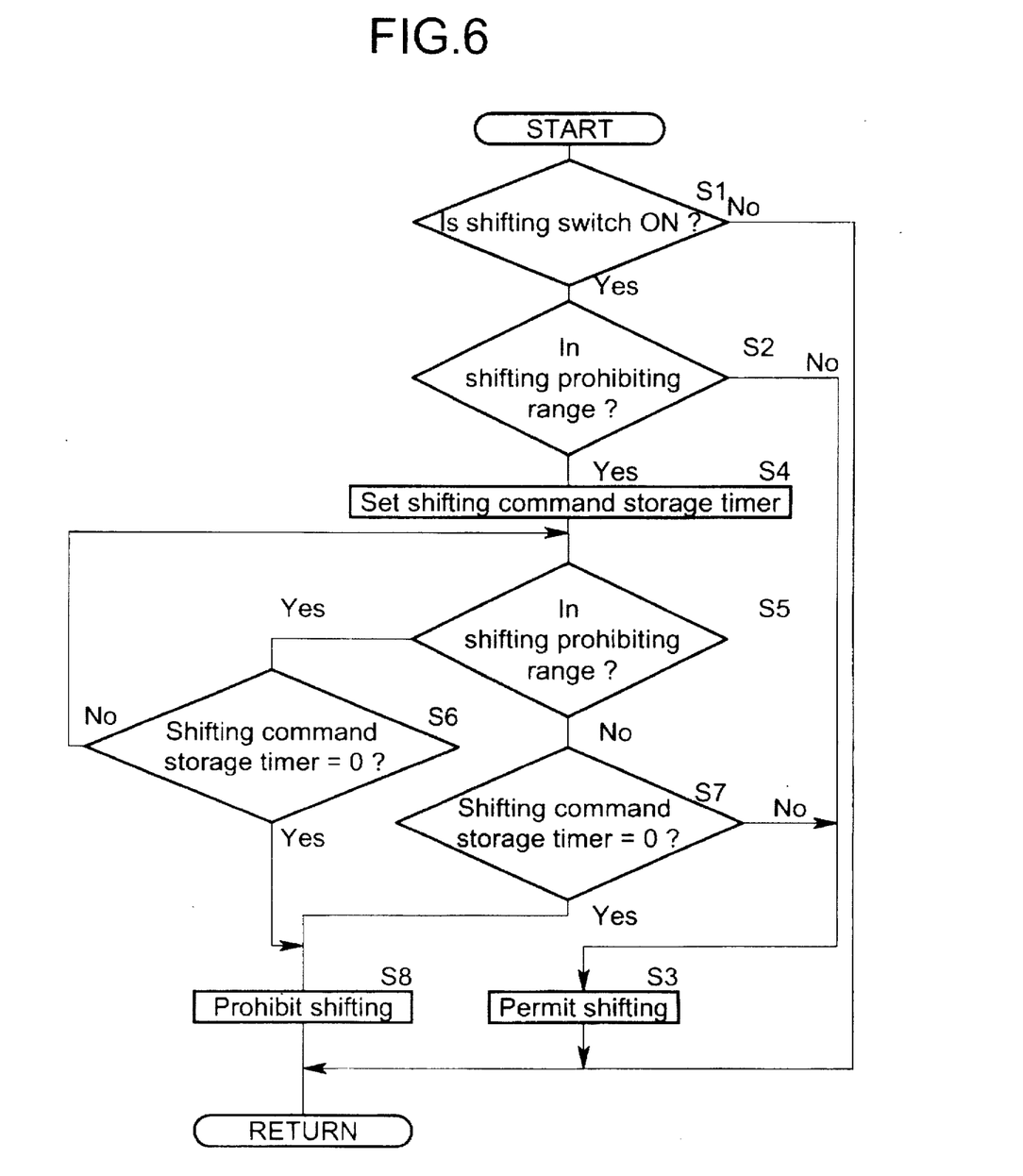
FIG. 6 is a flow chart for explaining the operation.

First, when the shifting switch (the upshifting switch $S_7$ or the downshifting switch $S_8$) is operated in the "M" range (at step S1), a shifting command is stored and it is judged whether the present operational state of the vehicle is in a shifting prohibiting range (at step S2). For example, when a downshifting command is output by the operation of the downshifting switch $S_8$, it is decided that the operational state of the vehicle is in the shifting prohibiting range, if the present vehicle speed V is excessively large, and an over-revolution would be generated when the downshifting is carried out. It is decided that the operational state of the vehicle is in a shifting permitting range, if an over-revolution would not be generated. On the other hand, when an upshifting command is output by the operation of the upshifting switch $S_7$, it is decided that the operational state of the vehicle is in the shifting prohibiting range, if the present vehicle speed V is excessively small, and the stalling of the engine E would occur when the upshifting is carried out. It is decided that the operational state of the vehicle is in the shifting permitting range, if the stalling would not occur.

If the answer at step S2 is NO (indicating that the operational state of the vehicle is in the shifting permitting range) the shifting is permitted (at step S3). If the downshifting command is output, the present gear shift stage is downshifted to a gear shift stage by one stage. If the upshifting command is output, the present gear shift stage is upshifted to a gear shift stage by one stage.

On the other hand, if the answer at step S2 is YES (indicating that the operational state of the vehicle is in the shifting prohibiting range) a shifting command storage timer is set (at step S4). At the beginning of setting of the shifting command storage timer at step S4, the operational state of the vehicle is still in the shifting prohibiting range (at step S5), and the shifting command storage timer is counting (at step S6) and hence, a loop of steps S5 and S6 is repeated. Thereafter, if the time is counted up in the shifting command storage timer (that is, if the shifting command storage timer=0) without translation from the shifting prohibiting range to the shifting permitting range (at step S6), the shifting is prohibited, and the shifting command is canceled (step S8).

During the counting by the shifting command storage timer, i.e., while the shifting commanded by a driver is being retarded, the informing means A is operated to inform the driver. Thus, it is possible for the driver to reliably recognize the shift retarding in order to eliminate the experience of a sense of incompatibility, and also to prevent an unnecessary re-operation of the shifting switch. The duration of operation of the informing means A can be set at a given period of time from the start of the counting by the shifting command storage timer.

When the vehicle speed is translated from the shifting prohibiting range to the shifting permitting range during repetition of the loop of steps S5 and S6 (at step S5), the shifting command is executed (at steps S7 and S3), if the shifting command storage timer is still counting. On the other hand, if the time has already been counted up by the shifting command storage timer (that is, the shifting command stage timer=0), the shifting command is canceled (at steps S7 and S8).

The contents of the flow chart will be further described with reference to FIG. 7.

Figure 7:
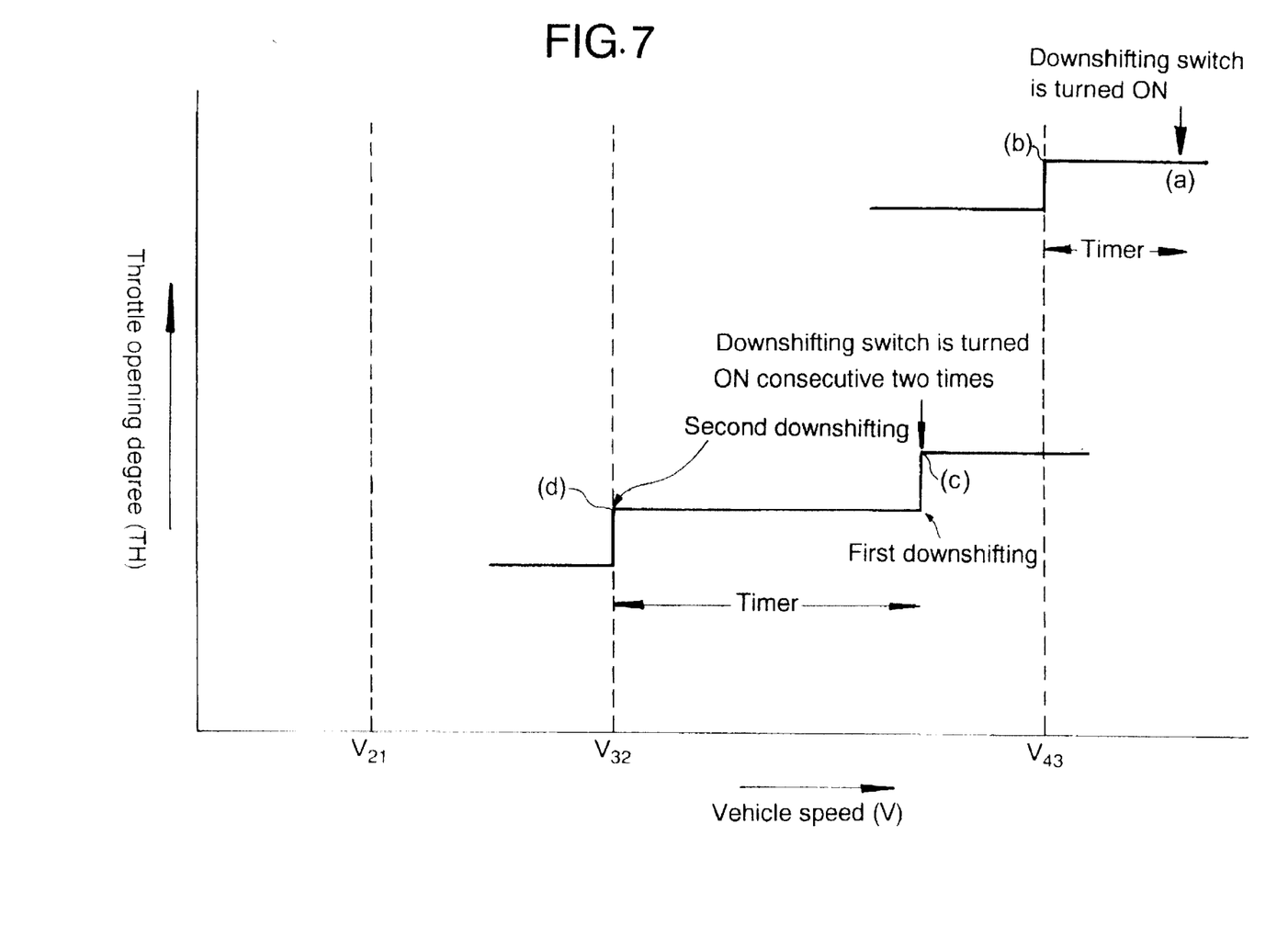
FIG. 7 is a diagram illustrating a shifting schedule.

FIG. 7 illustrates the shifting schedule where the downshifting switch $S_8$ is operated to conduct the downshifting. In FIG. 7, $V_{43}$ is a vehicle speed at which the downshifting from the fourth gear shift stage to the third gear shift stage is permitted; $V_{32}$ is a vehicle speed at which the downshifting from the third gear shift stage to the second gear shift stage is permitted; and $V_{21}$ is a vehicle speed at which the downshifting from the second gear shift stage to the first gear shift stage is permitted. Therefore, for the downshifting from the fourth gear shift stage to the third gear shift stage, regions on the right and left of the line of the vehicle speed $V_{43}$ are shifting prohibiting and permitting ranges, respectively. For the downshifting from the second gear shift stage to the first gear shift stage, regions on the right and left of the line of the vehicle speed $V_{21}$ are shifting prohibiting and permitting ranges, respectively.

When the downshifting switch $S_8$ is operated one time at position (a) shown in FIG. 7, for the downshifting to the third gear shift stage during traveling of the vehicle in the fourth gear shift stage, such downshifting is prohibited, and the shifting command storage timer is set, because one position (a) is in the shifting prohibiting range. Thus, when the vehicle speed V is reduced down to $V_{43}$ before the counting-up of the time by the shifting command storage timer to eliminate a possibility of generation of an over-revolution, i.e., when the vehicle speed is translated from the shifting prohibiting range to the shifting permitting range, the downshifting from the fourth gear shift stage to the third gear shift stage is carried out at position (b).

When the downshifting switch $S_8$ is operated two times consecutively at position (c) shown in FIG. 7 for the downshifting to the second gear shift stage during traveling of the vehicle in the fourth gear shift stage, the downshifting from the fourth gear shift stage to the third gear shift stage by the first operation of the downshifting switch $S_8$ is immediately carried out, because the position (c) is in the shifting permitting range for the downshifting from the fourth gear shift stage to the third gear shift stage. However, the downshifting from the third gear shift stage to the second gear shift stage by the second operation of the downshifting switch $S_8$ is prohibited and the shifting command storage timer is set, because the position (c) is in the shifting prohibiting range for the downshifting from the third gear shift stage to the second gear shift stage. Thus, when the vehicle speed V is reduced down to $V_{32}$ before the counting-up of the time by the shifting command storage timer to eliminate a possibility of generation of an over-revolution, i.e., when the vehicle speed is translated from the shifting prohibiting range to the shifting permitting range, the downshifting from the third gear shift stage to the second gear shift stage is carried out at position (d).

When the shifting switch is operated three consecutive times or more, the first and second operations are stored, but the third and subsequent operations are disregarded.

Although the downshifting has been described with reference to FIG. 7, a similar control is carried out even in the case of the upshifting, based on the flow chart shown in FIG. 6. In the shifting prohibiting range where there is a possibility of stalling of the engine E, the upshifting is limited.

The time counted by the shifting command storage timer is several seconds. For example, in the case of downshifting, the counted time is set at 0.8 seconds in downshifting from the fourth gear shift stage to the third gear shift stage, at 1.2 seconds in downshifting from the third gear shift stage to the second gear shift stage; and at 5.1 seconds in downshifting from the second gear shift stage to the first gear shift stage. In the case of the downshifting, time counted by the shifting command storage timer is set at a longer time, as compared with that in the upshifting.

More specifically, in manual shifting, the frequency of downshifting demanded by the driver is high, and downshifting is carried out mainly when the vehicle runs up a slope, or when the vehicle is decelerated using engine braking. For this reason, the change in vehicle speed is relatively large, and a lot of time is taken for translation of the vehicle speed from the shifting prohibiting range to the shifting permitting range and hence, the time counted by the shifting command storage timer in downshifting is set at a relatively long level, as compared with in upshifting.

When the shifting switch is operated two times consecutively for a two-stage shifting, the driver anticipates a long shifting time required, as compared with in a one-stage shifting. Therefore, the time counted by the shifting command storage timer in the two-stage shifting is set at a longer level than that the one-stage shifting.

Although the embodiment of the present invention has been described in detail, it will be understood that the present invention is not limited to the above-described embodiment, and various modifications may be made without departing from the spirit and scope of the invention as defined in the claims.

For example, although the shifting prohibiting and permitting ranges have been determined based on the vehicle speed in the above embodiment, they may be determined based on the throttle opening degree TH, or based on both of the vehicle speed V and the throttle opening degree TH.

As discussed above, according to the present invention, when the shifting command is output in the shifting prohibiting range, the execution of the shifting command is retarded. When the vehicle speed reaches the shifting permitting range within the predetermined period after the output of the shifting command, the shifting command is executed. Therefore, even if an inappropriate shifting command is performed, not only the generation of an over-revolution and stalling of the engine is prevented, but also the driver's shifting command can be possibly executed to eliminate the need for re-operation.

According to another feature of the present invention, it is possible to reliably perform the detection of the predetermined period by the timer.

According to a further feature of the present invention, it is possible to cause the driver to recognize the retarding of the shifting to prevent the driver from feeling a sense of incompatibility and to avoid the mis-recognition of generation of a trouble.

According to additional features of the present invention, the manual downshifting and upshifting can be performed.

According to still additional features of the present invention, an optimal manual shifting characteristic suitable for the operational state of the vehicle can be provided.

We claim:

1. A control system for an automatic transmission for a vehicle for controlling a gear ratio of the automatic transmission based on an output from a vehicle speed detecting means for detecting a value corresponding to a vehicle speed and an output from an engine load detecting means for detecting a value corresponding to an engine load, said system comprising:

a shifting command means for outputting a predetermined shifting command by a manual operation for changing the gear ratio;

judging means for judging whether or not an operational state of the vehicle is brought into a prohibiting range, in which the execution of the shifting command is prohibited in order to prevent occurrence of over-revolution or stalling of the engine, based on at least one of an output from said vehicle speed detecting means and an output from said engine load detecting means, when said shifting command is output;

prohibiting means for prohibiting execution of said shifting command when said judging means judges that the operational state of the vehicle is in said prohibiting range; and cancelling means for cancelling said shifting command when a time, which has passed since said shifting command means output said shifting command, exceeds a predetermined period of time.

2. A control system for an automatic transmission for a vehicle according to claim 1, wherein said predetermined period is counted by a timer which starts counting the time period when said shifting command is output by the shifting command means.

3. A control system for an automatic transmission for a vehicle according to claim 1, further including an informing means for informing a driver that the shifting command has been output in the shifting prohibiting range.

4. A control system for an automatic transmission for a vehicle according to claim 1, wherein said shifting command output by said shifting command means is a downshifting command.

5. A control system for an automatic transmission for a vehicle according to claim 1, wherein said shifting command output by said shifting command means is an upshifting command.

6. A control system for an automatic transmission for a vehicle according to claim 1, wherein said predetermined period is variable depending upon the type of shifting command.

7. A control system for an automatic transmission for a vehicle according to claim 6, wherein said type of the shifting command includes a downshifting command and an upshifting command.

8. A control system for an automatic transmission for a vehicle according to claim 7, wherein said predetermined period in the downshifting is longer than that in the upshifting.

9. A control system for an automatic transmission for a vehicle according to claim 6, wherein said type of the shifting command includes a one-stage shifting command and a multi-stage shifting command.

10. A control system for an automatic transmission for a vehicle according to claim 9, wherein said predetermined period in the multi-stage shifting is longer than that in the one-stage shifting.

11. A control system for an automatic transmission for a vehicle for controlling a gear ratio of the automatic transmission based on an output from a vehicle speed detecting means for detecting a value corresponding to a vehicle speed and an output from an engine load detecting means for detecting a value corresponding to an engine load, said system comprising:

a shifting command means for outputting a predetermined shifting command by a manual operation for changing the gear ratio;

a range determining means for determining whether or not current driving conditions fall within a permitting range in which the execution of a command output by the shifting command means is permitted, and a prohibiting range in which the execution of the shifting command is prohibited, based on at least one of an output from said vehicle speed detecting means and an output from said engine load detecting means; and a retarding means for enabling execution of the shifting command when an operational state of the vehicle is brought into said shifting permitting range within a predetermined period after the operational state of the vehicle is brought into said shifting prohibiting range and said shifting command is output by the shifting command means, wherein said predetermined period is variable depending upon the type of shifting command.

12. A control system for an automatic transmission for a vehicle according to claim 11, wherein said type of the shifting command includes a downshifting command and an upshifting command.

13. A control system for an automatic transmission for a vehicle according to claim 12, wherein said predetermined period in the downshifting is longer than that in the upshifting.

14. A control system for an automatic transmission for a vehicle according to claim 11, wherein said type of the shifting command includes a one-stage shifting command and a multi-stage shifting command.

15. A control system for an automatic transmission for a vehicle according to claim 14, wherein said predetermined period in the multi-stage shifting is longer than that in the one-stage shifting.

16. A method of controlling a gear ratio of an automatic transmission of a vehicle, based on an output from a vehicle speed detecting means and an output from an engine load detecting means, said method comprising the steps of:

outputting a predetermined shifting command by a manual operation for changing the gear ratio;

judging whether or not an operational state of the vehicle is brought into a prohibiting range, in which the execution of the shifting command is prohibited in order to prevent occurrence of over-revolution or stalling of the engine, based on at least one of an output from said vehicle speed detecting means and an output from said engine load detecting means, when said shifting command is output;

prohibiting an execution of said shifting command when said judging step judges that the operational state of the vehicle is in said prohibiting range; and cancelling said shifting command when a time, which has passed since said shifting command was output, exceeds a predetermined period of time.

* * * * *